US011955803B2

(12) United States Patent
Elshafie et al.

(10) Patent No.: US 11,955,803 B2
(45) Date of Patent: Apr. 9, 2024

(54) TECHNIQUES FOR ADVANCED WIRELESS ENERGY HARVESTING USER EQUIPMENTS TO PERFORM POWER SPLITTING PER RECEIVER OR RECEIVER GROUP

(71) Applicant: QUALCOMM Incorporated, San Diego, CA (US)

(72) Inventors: Ahmed Elshafie, San Diego, CA (US); Sony Akkarakaran, Poway, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 17/232,993

(22) Filed: Apr. 16, 2021

(65) Prior Publication Data

US 2022/0337084 A1    Oct. 20, 2022

(51) Int. Cl.
*H02J 50/00* (2016.01)
*H01Q 1/24* (2006.01)
*H02J 50/27* (2016.01)
*H02J 50/40* (2016.01)
*H02J 50/80* (2016.01)
*H04W 72/23* (2023.01)

(52) U.S. Cl.
CPC .......... *H02J 50/001* (2020.01); *H01Q 1/248* (2013.01); *H02J 50/27* (2016.02); *H02J 50/40* (2016.02); *H02J 50/80* (2016.02); *H04W 72/23* (2023.01)

(58) Field of Classification Search
CPC .......... H02J 50/001; H02J 50/80; H02J 50/27; H02J 50/40; H04W 72/23; H01Q 1/248
USPC ......................................................... 320/108
See application file for complete search history.

(56) References Cited

U.S. PATENT DOCUMENTS 11,722,177 B2 *   8/2023   Leabman .............. H02J 50/402
                                                                   320/108
2021/0259096 A1 *  8/2021   Diaz .................... H05K 1/0243

* cited by examiner

*Primary Examiner* — Nathaniel R Pelton
(74) *Attorney, Agent, or Firm* — Arent Fox, LLP and Qualcomm, Incorporated

(57) ABSTRACT

Techniques for advanced wireless energy harvesting user equipments (UEs) to perform power splitting per receiver or receiver group. In an example, a UE may configure a first antenna of a plurality of receiving antennas of the UE according to a first factor of a plurality of power splitting factors and a second antenna of the plurality of receiving antennas according to a second factor of the plurality of power splitting factors, the second antenna being different from the first antenna. The UE may also perform energy harvesting operations on the first antenna according to the first factor and on the second antenna according to the second factor.

30 Claims, 10 Drawing Sheets

TECHNIQUES FOR ADVANCED WIRELESS ENERGY HARVESTING USER EQUIPMENTS TO PERFORM POWER SPLITTING PER RECEIVER OR RECEIVER GROUP

TECHNICAL FIELD

Aspects of the present disclosure relate generally to wireless communications, and more particularly, to techniques for advanced wireless energy harvesting user equipments (UEs) to perform power splitting per receiver or receiver group.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication for a user equipment (UE) is provided. The method may include configuring a first splitter of a plurality of power splitters of the UE corresponding to a first antenna of a plurality of receiving antennas of the UE according to a first factor of a plurality of power splitting factors and a second splitter of the plurality of power splitters corresponding to a second antenna of the plurality of receiving antennas according to a second factor of the plurality of power splitting factors. The method may also include performing energy harvesting operations on a first signal received by the first antenna according to the first factor and on a second signal received by the second antenna according to the second factor.

In another aspect, a method of wireless communication for a controlling device is provided. The method may include determining a plurality of power splitting factors for a plurality of receiving antennas of a UE. The method may also include communicating, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

In another aspect, a UE including a memory comprising instructions, and one or more processors coupled with the memory, is provided. The one or more processors may be configured to configure a first splitter of a plurality of power splitters of the UE corresponding to a first antenna of a plurality of receiving antennas of the UE according to a first factor of a plurality of power splitting factors and a second splitter of the plurality of power splitters corresponding to a second antenna of the plurality of receiving antennas according to a second factor of the plurality of power splitting factors. The one or more processors may be configured to perform energy harvesting operations on a first signal received by the first antenna according to the first factor and on a second signal received by the second antenna according to the second factor.

In yet another example, a controlling device including a memory comprising instructions, and one or more processors coupled with the memory, is provided. The one or more processors may be configured to determine a plurality of power splitting factors for a plurality of receiving antennas of a UE. The one or more processors may be configured to communicate, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

In other aspects, apparatuses and computer-readable mediums for performing the above-disclosed methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illus

DETAILED DESCRIPTION

Figure 1:
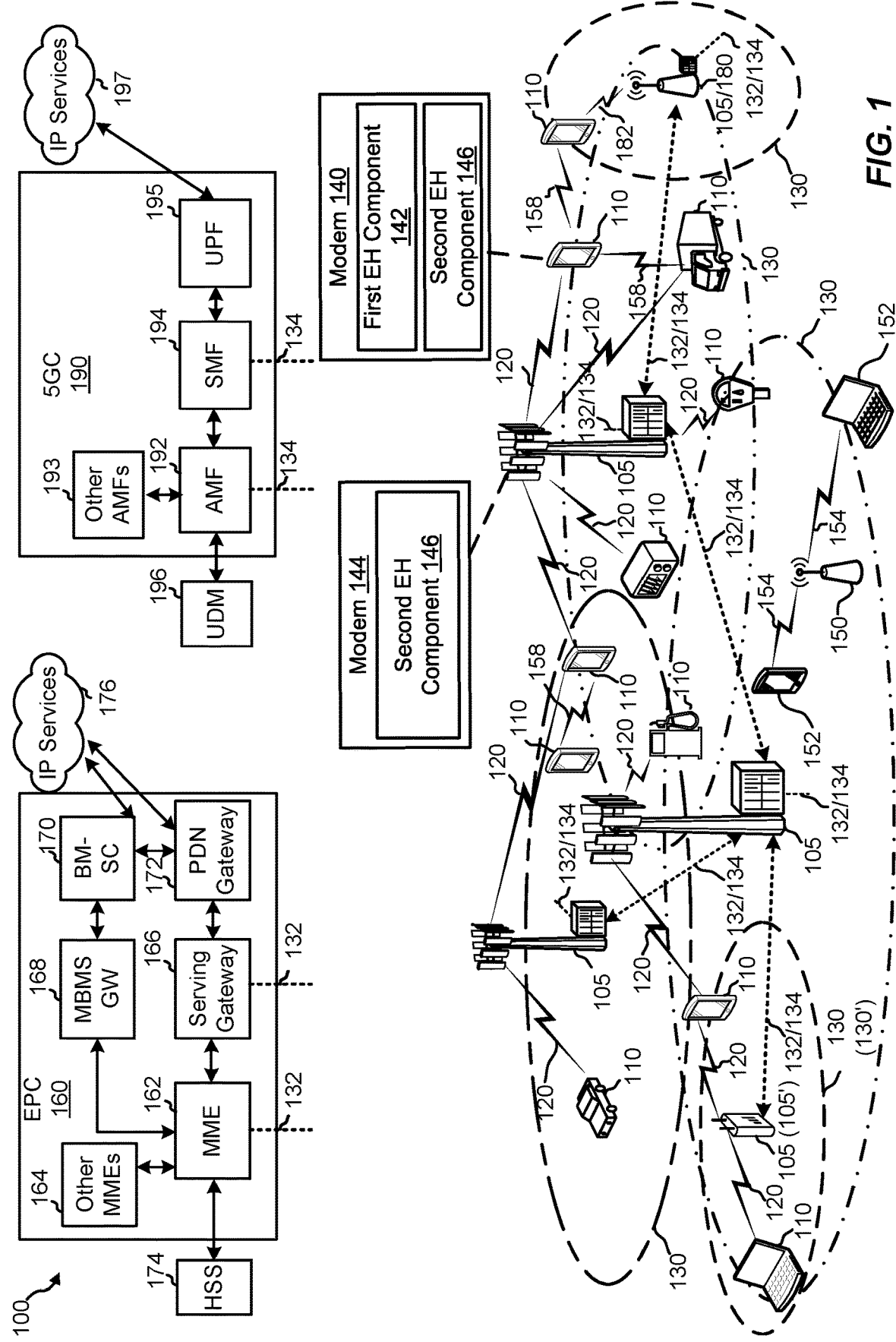
- FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless communication devices may use a power splitting scheme for radio frequency (RF) energy harvesting (EH) to capture energy from received RF signals. In this scheme, received RF signals are split into two streams for an information receiver and an RF energy harvester of the device. Conventionally, the device uses power splitting fixed across all receiving chains of the device.

The present disclosure provides techniques for advanced RF EH for a wireless communication device. In particular, the present disclosure provides techniques for power splitting per receiving antenna of the device in order to optimize power allocation and EH.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In some implementations, a UE 110 may include a modem 140 and/or a first EH 142 for configuring power splitting factors for EH on a per receiving chain or group of receiving chain basis. The UE 110 (to perform functions as a controlling device) may also include the modem 140 and/or a second EH 146 or a base station 105 (to perform functions as a controlling device) may include a modem 144 and/or the second EH component 146 for configuring power splitting factors for EH on a per receiving chain or group of receiving chains of another device (e.g., another UE 110 such as a wearable).

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
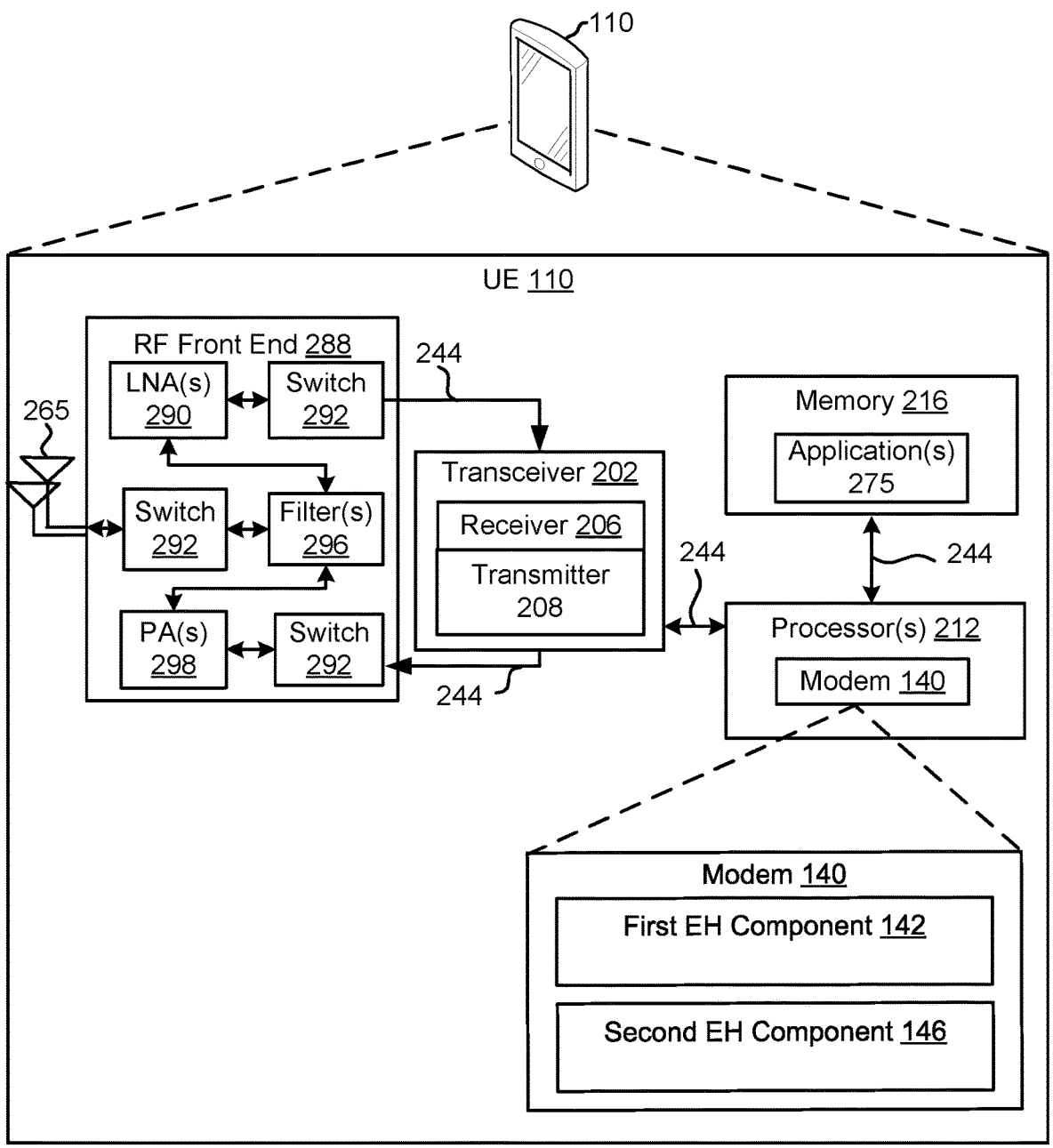
FIG. 2 is a schematic diagram of an example of a user equipment (UE) of FIG. 1, according to aspects of the present disclosure.

Referring to FIG. 2, an example implementation of a UE 110 may include the modem 140 having the first EH component 142 and/or having the second EH component 146. The modem 140 and/or the first EH component 142 of the UE 110 may be configured to configure power splitting factors for EH on a per receiving chain or group of receiving chain basis, as described in further detail herein. The modem 140 and/or the second EH component 146 of the UE 110 may be configured to configure power splitting factors for EH on a per receiving chain or a group of receiving chains of another device (e.g., UE 110 or wearable), as described in further detail herein.

In some implementations, the UE 110 may include a variety of components, including components such as one or more processors 212 and memory 216 and transceiver 202 in communication via one or more buses 244, which may operate in conjunction with the modem 140 and/or the first EH component 142 (or the second EH component 146) to enable one or more of the functions related to splitting factors for EH, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the first EH component 142 (or the second EH component 146) may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the first EH component 142 (or the second EH component 146) may be performed by the transceiver 202.

Also, the memory 216 may be configured to store data used herein and/or local versions of applications 275 or the first EH component 142 (or the second EH component 146) and/or one or more subcomponents of the first EH component 142 (or the second EH component 146) being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the first EH component 142 (or the second EH component 146) and/or one or more of its subcomponents, and/or data associated therewith, when the UE 110 is operating at least one processor 212 to execute the first EH component 142 (or the second EH component 146) and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on UE configuration information associated with the UE 110 as provided by the network (e.g., base station 105).

Figure 3:
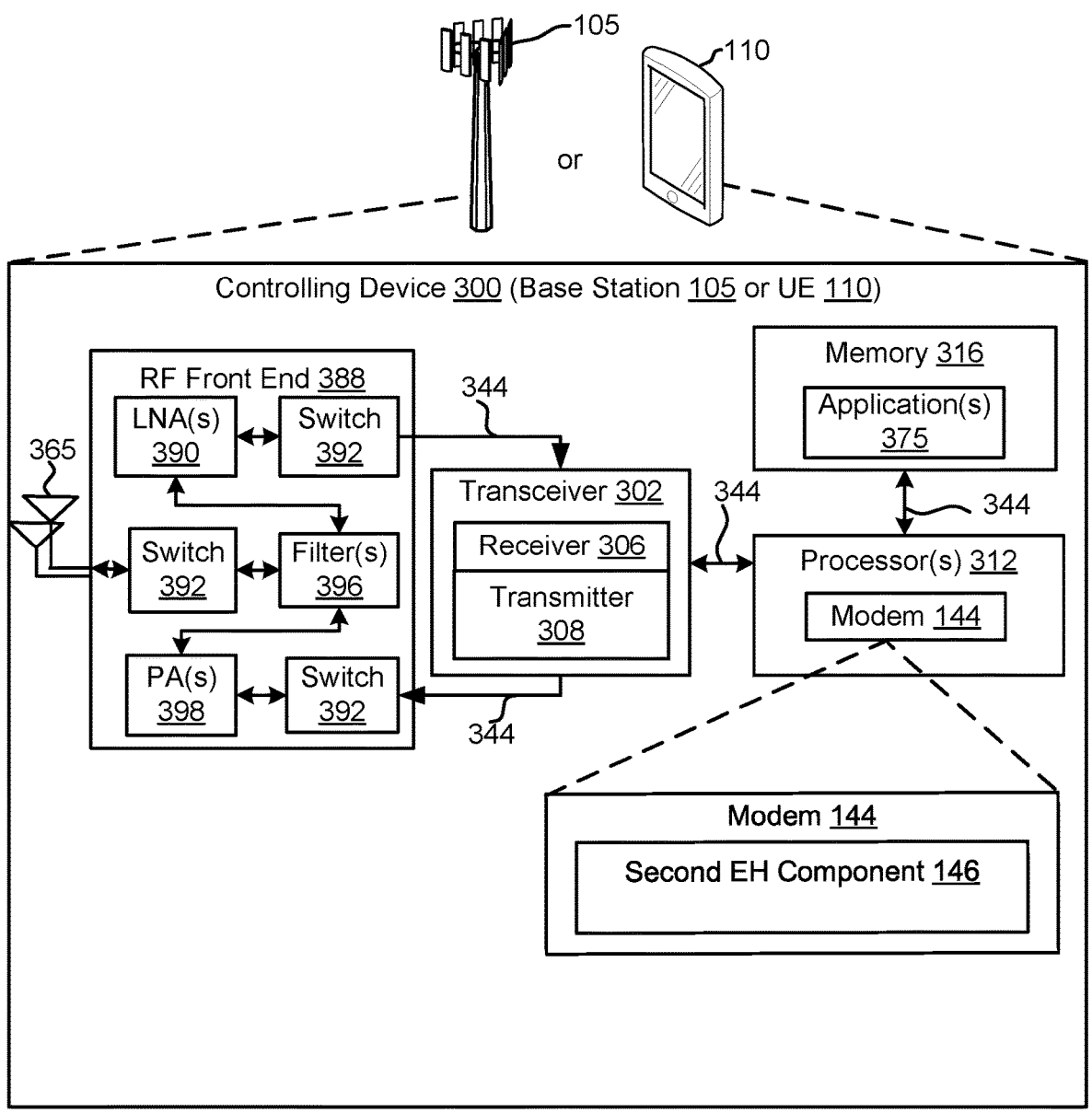
FIG. 3 is a schematic diagram of an example of a base station of FIG. 1, according to aspects of the present disclosure.

Referring to FIG. 3, an example implementation of a controlling device 300 (e.g., base station 105 or UE 110) may include a modem 144 having the second EH component 146. The modem 144 and/or the second EH component 146 of the controlling device 300 may be configured to implement functions of configuring power splitting factors for EH on a per receiving chain or group of receiving chains of another device, as described in further detail herein.

In some implementations, the controlling device 300 may include a variety of components, including components such as one or more processors 312 and memory 316 and transceiver 302 in communication via one or more buses 344, which may operate in conjunction with the modem 144 to enable one or more of the functions related to configuring power splitting factors for EH, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions of the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the controlling device 300 and the processors 312. In other aspects, some of the features of the one or more processors 312 and/or the modem 144 may be performed by the transceiver 302.

Also, the memory 316 may be configured to store data used herein and/or local versions of applications 375, and/or one or more subcomponents of the modem 144 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 144 and/or one or more of the subcomponents, and/or data associated therewith, when the controlling device 300 is operating at least one processor 312 to execute the modem 144 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the controlling device 300 may include the RF front end 388, which may operate in communication with one or more antennas 365 and the transceiver 302 for receiving and transmitting radio transmissions, for example, wireless communications transmitted by the controlling device 300 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the controlling device 300 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the controlling device 300 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the controlling device 300 (e.g., RF front end 388, transceiver 302) to enable transmission and/or reception of signals from the network based on a specified modem configuration. In an aspect, the modem configuration may be based on the mode of the modem 144 and the frequency band in use.

A number of sources (e.g., wind, solar, vibrations) may provide EH. However, unlike these sources RF sources in a radio frequency (RF) EH scheme may provide controllable and constant energy transfer over distance for RF energy harvesters. Further, in a fixed RF EH network, the harvested energy may be predictable and relatively stable over time due to fixed distances between devices.

Using a random multipath fading channel model, the energy harvested at a node j from a transmitting node i may be given by:

$$E_j = \eta P_i |g_{i-j}|^2 T,$$

where $P_i$ is a transmit power by node i, $g_{i-j}$ is a channel coefficient of a link between node i and node j, T is a time allocated for EH, and $\eta$ is an RF-to-DC conversion efficiency.

Figure 4:
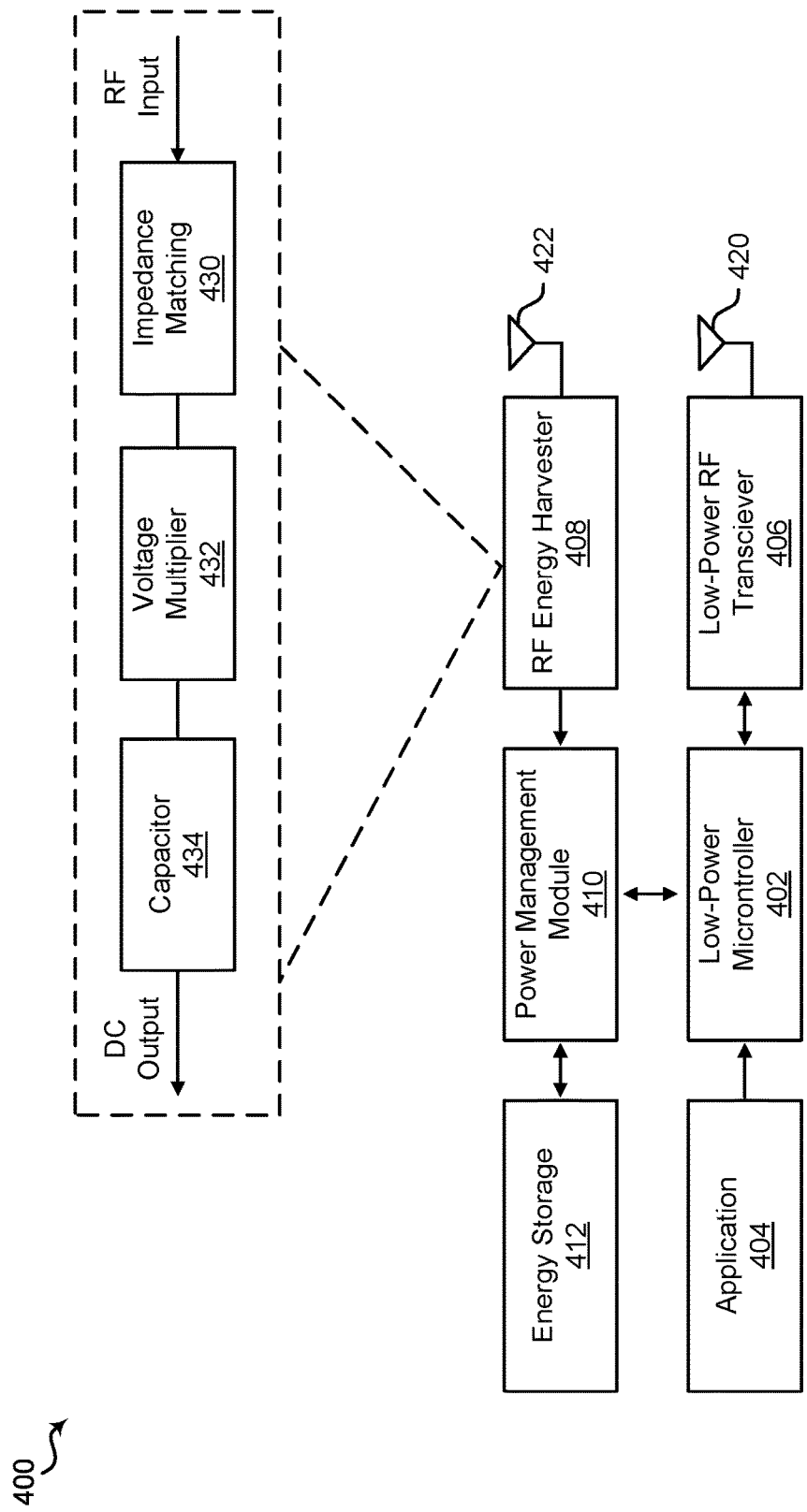
FIG. 4 is a block diagram of example components for an energy harvesting (EH) node, according to aspects of the present disclosure.

Referring to FIG. 4, an RF EH node 400 may comprise a low-power microcontroller 402 to process data including data received from other devices and/or instructions from an application 404, a low-power RF transceiver 404 for information transmission or reception via an antenna 420, an energy harvester 406 to collect RF signals via an RF antenna 422 and convert them into electricity. To convert the signals into energy, the energy harvester 406 may receive an RF input via the antenna 422 which is passed through, for example, an impedance matching component 430, a voltage multiplier 432, and a capacitor 434, and provide a direct current (DC) output to a power management module 408, which decides whether to store the electricity obtained from the RF energy harvester 408 or to use the electricity for information transmission immediately or store the electricity in an energy storage 412 (e.g., battery).

Figure 5A:
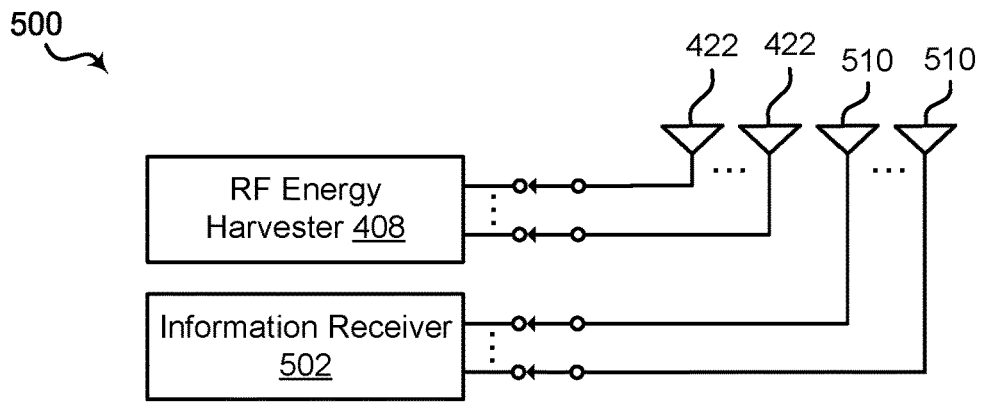
FIGS. 5A-5C are block diagrams of example EH schemes, according to aspects of the present disclosure.
Figure 5B:
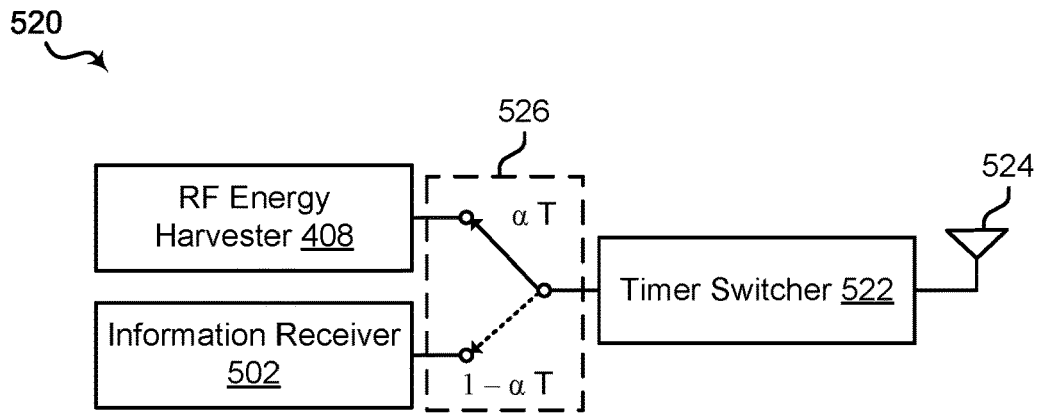
Figure 5C:
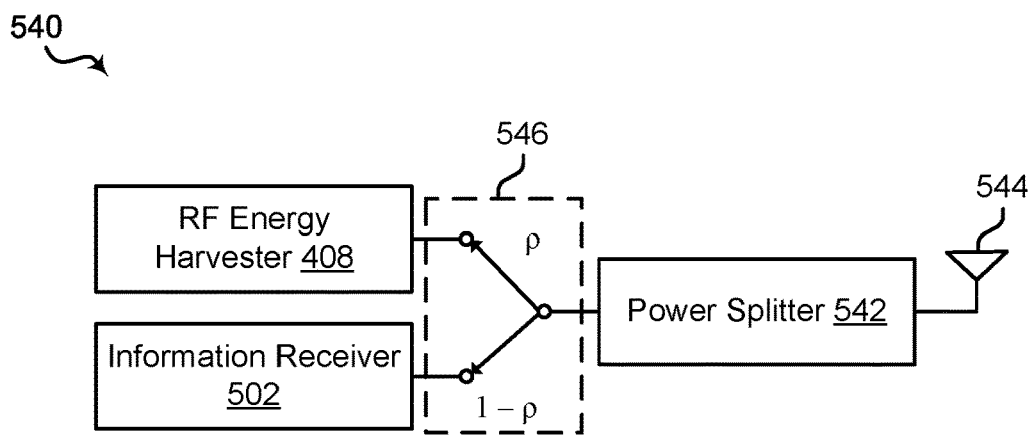

Referring to FIGS. 5A-5C, three types of EH techniques (or architectures or schemes) are conventionally used—a separated receiver architecture 500 of FIG. 5A, a time-switching architecture 520 of FIG. 5B, and a power-splitting architecture 540 of FIG. 5C. Referring to FIG. 5A, the separated receiver architecture 500 implements the RF EH 408 using separate antennas 422 from antennas 510 used by an information receiver 502.

Referring to FIG. 5B, in the time-switching architecture 520, a time switcher 522 controls a switch 526 to switch received RF signals from an antenna 524 between the information receiver 502 and the RF energy harvester 408. In an example, the energy harvested at a receiver j from source i can be calculated as follows:

$$E_j = \eta P_i |g_{i-j}|^2 \alpha T,$$

where $0 \leq \alpha \leq 1$ is the fraction of time allocated for energy harvesting. Letting $\kappa$ and W denote the noise spectral density and channel bandwidth, the data rate R is given by:

$$R_{i-j} = (1-\alpha)\log_2\left(1 + \frac{|g_{i-j}|^2 P_i}{\kappa W}\right).$$

Referring to FIG. 5C, in the power-splitting architecture 540, a power splitter 542 controls a splitter 546 to split received RF signals from antenna 544 into two streams for the information receiver 502 and the RF energy harvester 408 with different power levels. For example, the energy harvested at receiver j from source i can be calculated as follows:

$$E_j = \eta \rho P_i |g_{i-j}|^2 T,$$

where $0 \leq \rho \leq 1$ is the fraction of power allocated for energy harvesting. The data rate R is given by:

$$R_{i-j} = \log_2\left(1 + \frac{|g_{i-j}|^2 (1-\rho) P_i}{\kappa W}\right).$$

Figure 6A:
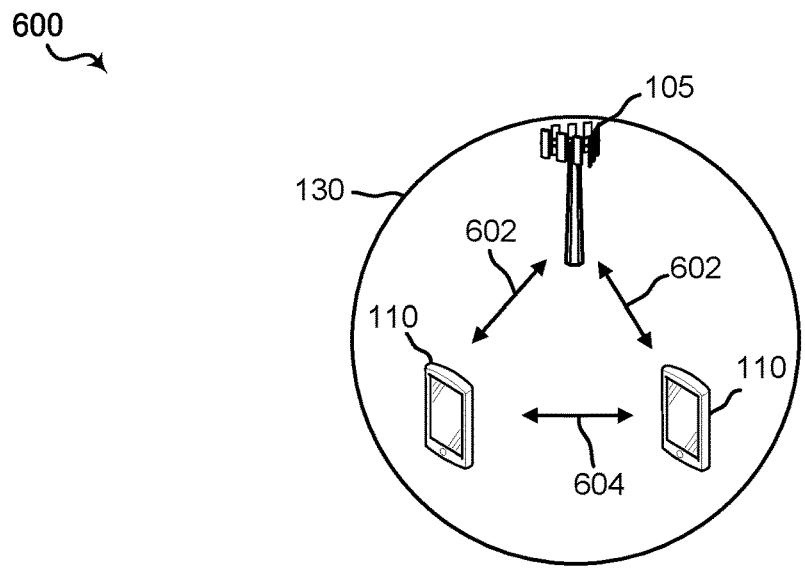
FIGS. 6A-6C are block diagrams of example communication coverage schemes, according to aspects of the present disclosure.
Figure 6B:
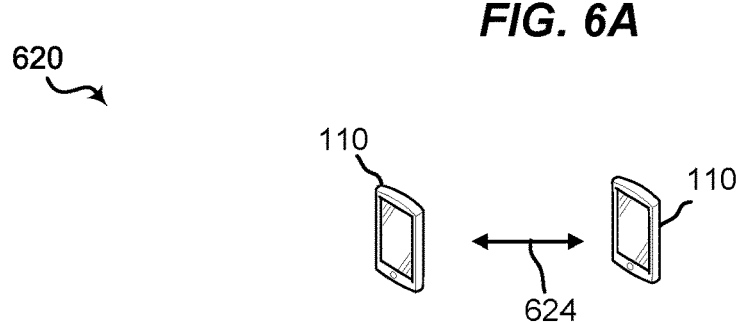
Figure 6C:
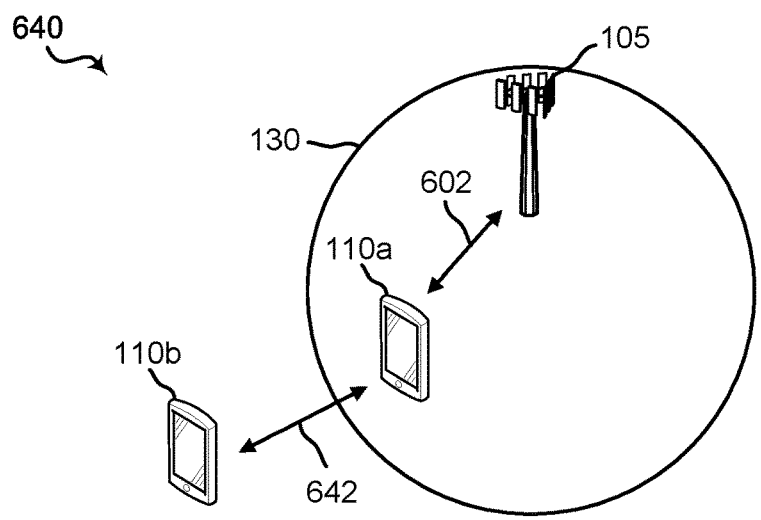

Referring to FIGS. 6A-6C, coverage scenarios may include an in-coverage scenario 600 of FIG. 6A, an out-of-coverage scenario 620 of FIG. 6B, or a partial coverage scenario 640 of FIG. 6C. Referring to FIG. 6A, in the in-coverage scenario 600, sidelink (SL) UEs 110 within the coverage area 130 of the base station 105 may individually communicatively couple to 5GC (not shown; see e.g., 5GC 190 of FIG. 1) via a Uu link 604 (e.g., any communication link between SL UE 110 and base station 105), and the SL UEs 110 may communicatively couple with each other via a SL 604 (e.g., direct communication link between the UEs 110). In this example, SL authorization and provisioning via the Uu link 602 may be necessary to support SL operations. Further, the base station 105 may control SL discovery/communication resource allocations for the UEs 110.

Referring to FIG. 6B, in the out-of-coverage scenario 620, the SL UEs 110 may communicatively communicate via a SL 624 and may not communicatively couple to 5GC. In an example, the SL UEs 110 may operate without authorization and provisioning via a Uu link. Instead, the SL UEs 110 may be pre-configured with SL provisioning information for discovery/communication support.

Referring to FIG. 6C, in the partial coverage scenario 640, a first UE 110a may be within the coverage area 130 of the base station 105 and therefore may be communicatively coupled to 5GC via the Uu link 602. A second UE 110b may or may not be communicatively coupled to 5GC. In an example, the second UE 110b may communicatively couple to 5GC via the first UE 110a and a SL 642 using, for example, a relay operation. In this example, both authorization/provisioning via the Uu link 602 and pre-configured SL provisioning may be possible.

Figure 7A:
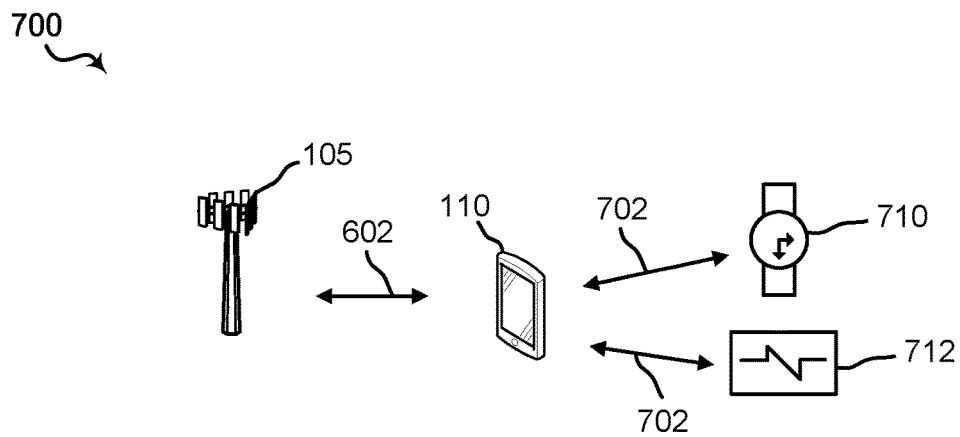
FIGS. 7A-7C are block diagrams of example wearable communication schemes, according to aspects of the present disclosure.
Figure 7B:
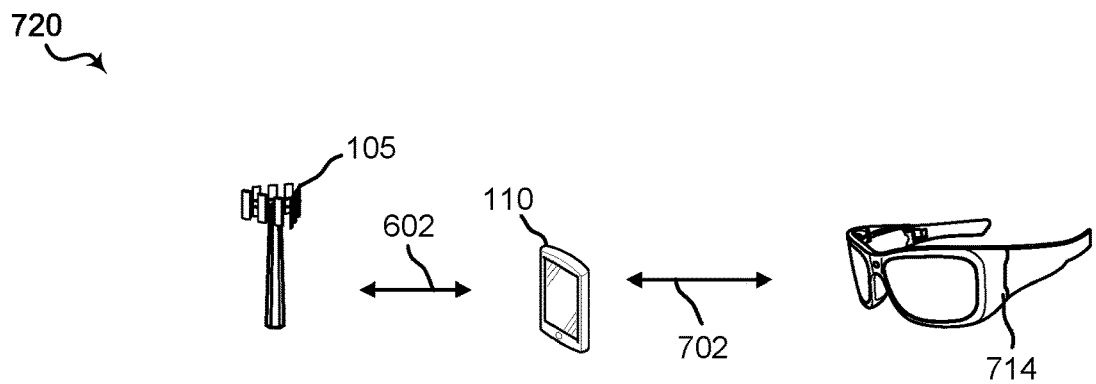
Figure 7C:
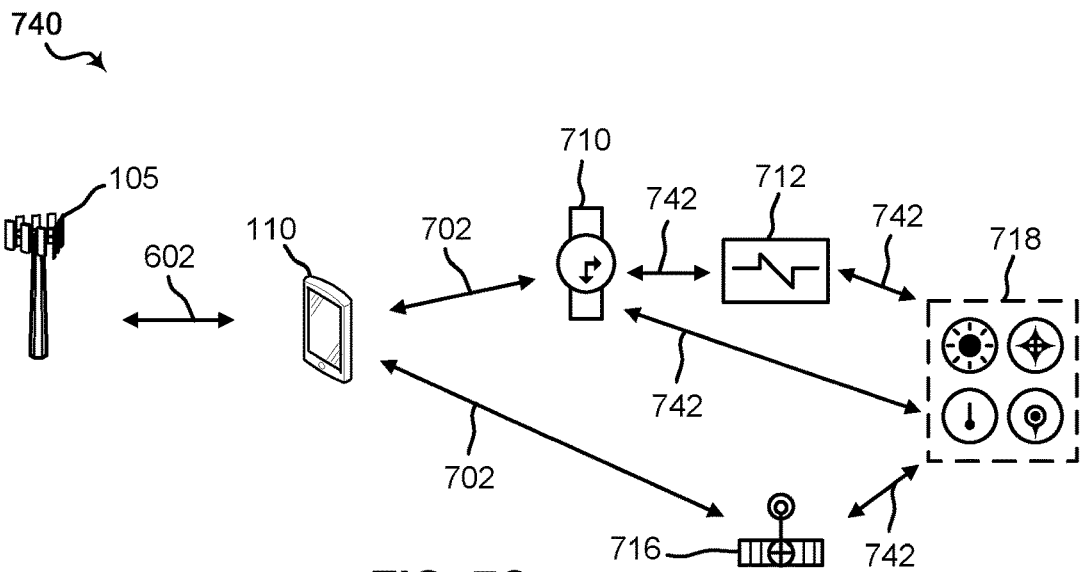

Referring to FIGS. 7A-7C, some UEs 110 may include wearables or other internet-of things (IoT) devices that tend to be low powered devices. Wearables may include, but are not limited to, smartwatches 710, health monitoring devices 712, head mounted displays (HMD) devices 714, or sensors 716 (including, e.g., appliances 718), and may have different communication scenarios than described by FIGS. 6A-6C. For example, in a first scenario 700 of FIG. 7A, the smartwatch 710 (with/without 5G modem) and/or the health monitoring device 712 may communicatively couple to the UE 110 via any type of SL 702 (e.g., in-coverage scenario 600, out-of-coverage scenario 620, or partial coverage scenario 640) and the UE 110 may communicatively couple to the base station 105 via the Uu link 602. In this example, these wearables operate via SL only, and the UE 110 performs a UE-to-NW relay operation. Similarly, for the second scenario 720 of FIG. 7B, the HMD device 712 may communicatively couple to the UE 110 via the SL 702 for an SL only operation, and the UE 110 performs a UE-to-NW relay operation with the base station 105 via the Uu link 602.

In a third scenario 740 of FIG. 7C, the sensors 716 may communicate with the UE 110 via the SL 702 using a SL only operation while the UE 110 communicates with the base station 105 via the Uu link 602 using a UE-to-NW relay operation. Further, in this example, the sensors 716 may communicate among themselves via, for example mesh (UE-to-UE relay) over SL 742. For example, the smart home appliances 718 (e.g., smart thermostat or entry key) may communicate via the mesh over SL 742 with the health monitor device 712, the smartwatch 710, and/or the sensors 716.

Based on these different scenarios, RF energy-harvesting may prolong battery lifetime of UEs and/or wearables. For example, wirelessly powering-devices may be used as incentives for devices to help each other. In literature, power splitting is fixed across all receiving chains, which is reasonable for cheap UEs. However, more advanced UEs may implement power splitting per receiver, which may allow for optimal allocation of power if that power splitting is used to control the energy flow per receiver.

In this disclosure, techniques for receiver power splitting are presented, including, for example, designs for joint long-term and short-term power splitting coefficients, novel methods for controlling energy, UE capabilities base on these techniques, and reporting to base stations.

Figure 8:
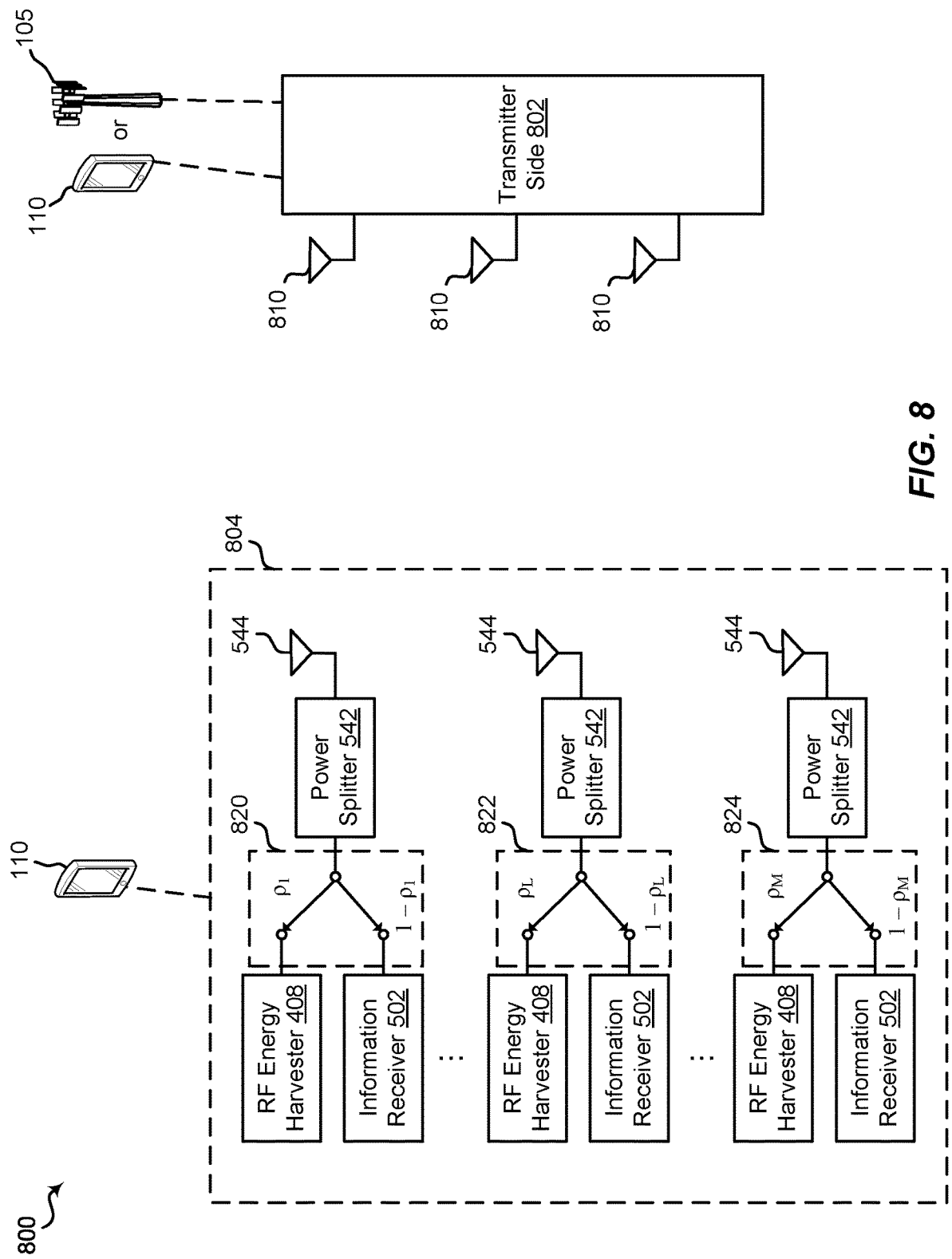
FIG. 8 is a block diagram of example EH power splitting factor scheme, according to aspects of the present disclosure.

Referring to FIG. 8, different power splitting factors may be used per receiver antenna. For example, a transmitter side 802 for a base station 105 may include a plurality of transmitting antennas 810, and a receiver side 804 for a UE 110 may include a plurality of power splitters 542 for each of the receiving antennas 544. In this example, each of the splitters 820, 822, and 824 may rely on different factors $\rho_1$, $\rho_L$, and $\rho_M$, respectively, for performing power splitting, were 1<L<M.

In an example, since increasing the power splitter p may increase the power allocated to an energy harvester (e.g., energy harvester 408), optimizing p from an energy point of view may not be beneficial. Instead, the problem may be better viewed from a data point of view.

In an aspect, the power splitting factors may be designed based on beamforming amplitude. For example, assuming a single-input-multiple-output (SIMO) scheme with M receiver antennas on UEs 110 (e.g., wearables), where M is any integer greater than 1 and may be equal to the number of splitters when each receiving antenna has its own splitter. In other words, in this example, it is assumed transmission side has 1 antenna and the receiving side has M antennas. In this example, an optimal combiner may include a maximal ratio combiner where, if a channel vector is h (1×M), the receiver may use h*, which is a conjugate transpose of h, and normalize over a channel vector norm. In this example, h is a channel coefficient vector between a transmission antenna and the M receiving antennas. The h may be a vector (e.g., an array) where the kth element is the channel coefficient (e.g., complex value) between the transmission antenna and the kth receiving antenna. Based on this, the combiner coefficient $W_c$ is $$W_c = \frac{h}{\|h\|}$$

with $$w_k = \frac{|h_k^*|}{\|h\|}\exp(-\theta_k)$$

with $h_k$ denoting a complex channel coefficient between a transmit antenna and a k-th receiver antenna, and θ being the phase. If the power splitting factor is $$\rho_k = F1(h)F2\left(\frac{|h_k^*|}{\|h\|}\right),$$

long-term channel characteristics may captured across all receivers and links by the general function F1(h) (which may be fixed for all $\rho_k$). On the other hand, the specific function $$F2\left(\frac{|h_k^*|}{\|h\|}\right),$$

or more general, F2($y_k$), where $y_k$ is the received signal at receive antenna k (with all components including data precoding, channel elements, etc.), may capture fast channel changes of the splitter.

In an aspect, the UE 110 may signal power splitting capabilities to the base station 110. For example, since using different power splitting factor requires some advancements to an architecture of the UE 110 (e.g., ability to use different power splitters for different antennas), the UE 110 may indicate these capabilities to the base station 105 (or a controlling UE 110).

In another aspect, if the UE 110 and/or the base station 105 knows the channels, and the base station 105 and the UE 110 agree to use the proposed idea of power splitting with the general function F1 and the specific function F2 preconfigured, then the UE 110 may not have to report a list of power splitting factors (e.g., M ρ's) to the base station 110. For example, the general function F1 and the specific function F2 may be signaled in a medium access control-control element (MAC-CE) signal, a radio resource control (RRC) signal, a DL control information (DCI) signal, or a SL control information (SCI) signal, as needed and based on statistical optimization of metrics (e.g., average throughput). In this example, the UE 110 may send (as suggestion) some values to the base station 105, and the base station 105 may determine a best use of the general function F1 and the specific function F2.

If the base station 105 does not know the channels or the base station 105 and the UE 110 have not agreed to use the proposed idea of power splitting, the UE 110 may report the list of power splitting factors list of power splitting factors (e.g., M ρ's) after obtaining them. For example, if the base station 105 has not received a list of estimated channels and/or a UL SRS from the UE 110, then the UE 110 may estimate the channel and use that to obtain the power splitting factors ρ's for each receiving antenna and provide the power splitting factors ρ's or indications of the power splitting factors ρ's to the base station 105.

The base station 110 may then use the list of power splitting factors to determine the data modulation and coding scheme (MCS) or rank indicator (RI). In an example, a mode of operation may be agreed upon between the UE 110 and the base station 105. The mode of operation may be signaled, for example, in an RRC signal.

In an aspect, the UE 110 and the base station 105 may agree to use the same general function F1 and specific function F2 for all receiver chains or a different general function F1 and specific function F2 for one or more of the receiver chains. In an example, this may be configured in, for example an RRC signal or an MAC-CE signal as needed. Also, agreement of the general function F1 and specific function F2 may be a part of a capabilities signal. In another example, a range of values for the general function F1 and the specific function F2 and/or power factor coefficients (ρ's) (in general) may be signaled between the UE 110 and the base station 105 based on part of a capability of the UE 110 sweeping those parameters.

In another aspect, mapping may be done for power splitting factors ($ρ_k$'s) so that they do not instantaneously depend on channels (e.g., power splitting factors ($ρ_k$'s) may changing at every channel coherence time).

In an aspect, the UE 110 may set a group of receivers to have the same $ρ_l$, where l may refer to a group index. In this example, the UE 110 and the base station 105 may agree on the group, then agree on power splitting per receiver group.

Figure 9:
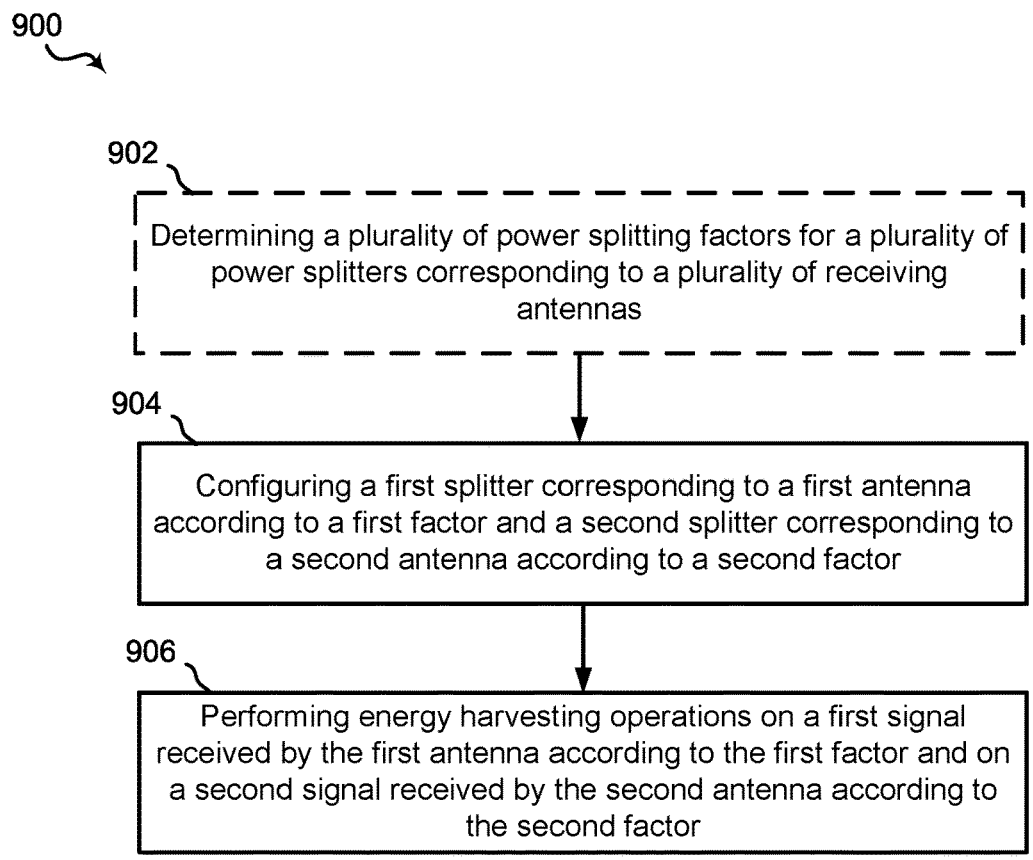
FIG. 9 is flowchart of an example method performed by the UE of FIG. 1, according to aspects of the present disclosure.

Referring to FIG. 9, an example of a method 900 for power splitting for wireless EH may be performed by the first EH component 142, the modem 140, the transceiver 202, the processor 212, the memory 216, and or any other component/subcomponent of the UE 110 of the wireless communication network 100.

At block 902, the method 900 may optionally include determining a plurality of power splitting factors for a plurality of power splitters corresponding to a plurality of receiving antennas. For example, the first EH component 142, the modem 140, the transceiver 202, the processor 212, and/or the memory 216 of the UE 110, and/or one or more additional components/subcomponents of the UE 110 may be configured to or may comprise means for determining a plurality of power splitting factors for a plurality of power splitters corresponding to a plurality of receiving antennas.

For example, the determining the plurality of power splitting factors at block 902 may include determining by the first EH component 142, the modem 140, the transceiver 202, the processor 212, and/or the memory 216 of the UE 110, the plurality of power splitting factors (e.g., ρ, $ρ_L$, $ρ_M$) for the plurality of power splitters 820, 822, 824 corresponding to the plurality of receiving antennas 544.

At block 904, the method 900 may include configuring a first splitter of the plurality of power splitters corresponding to a first antenna of the plurality of receiving antennas according to a first factor of the plurality of power splitting factors and a second splitter of the plurality of power splitters corresponding to a second antenna of the plurality of receiving antennas according to a second factor of the plurality of power splitting factors. For example, the first EH component 142, the modem 140, the transceiver 202, the processor 212, and/or the memory 216 of the UE 110, and/or one or more additional components/subcomponents of the UE 110 may be configured to or may comprise means for configuring a first splitter of the plurality of power splitters corresponding to a first antenna of the plurality of receiving antennas according to a first factor of the plurality of power splitting factors and a second splitter of the plurality of power splitters corresponding to a second antenna of the plurality of receiving antennas according to a second factor of the plurality of power splitting factors.

For example, the configuring the first splitter and the second splitter at block 904 may include configuring by the first EH component 142, the modem 140, the transceiver 202, the processor 212, and/or the memory 216 of the UE 110, the splitter 820 (first splitter) according to power factor ρ (e.g., first factor) and the splitter 822 to power factor $ρ_L$ (e.g., second factor).

At block 906, the method 900 may include performing energy harvesting operations on a first signal received by the first antenna according to the first factor and on a second signal received by the second antenna according to the second factor. For example, the first EH component 142, the modem 140, the transceiver 202, the processor 212, and/or the memory 216 of the UE 110, and/or one or more additional components/subcomponents of the UE 110 may be configured to or may comprise means for performing energy harvesting operations on a first signal received by the first antenna according to the first factor and on a second signal received by the second antenna according to the second factor.

For example, the performing EH operations at block 906 may include performing by the first EH component 142, the modem 140, the transceiver 202, the processor 212, and/or the memory 216 of the UE 110, EH operations on a first signal received by the first antenna 544 according to the power factor ρ (e.g., first factor) and on a second signal received by the second antenna 544 according to the power factor $\rho_L$ (e.g., second factor).

Figure 10:
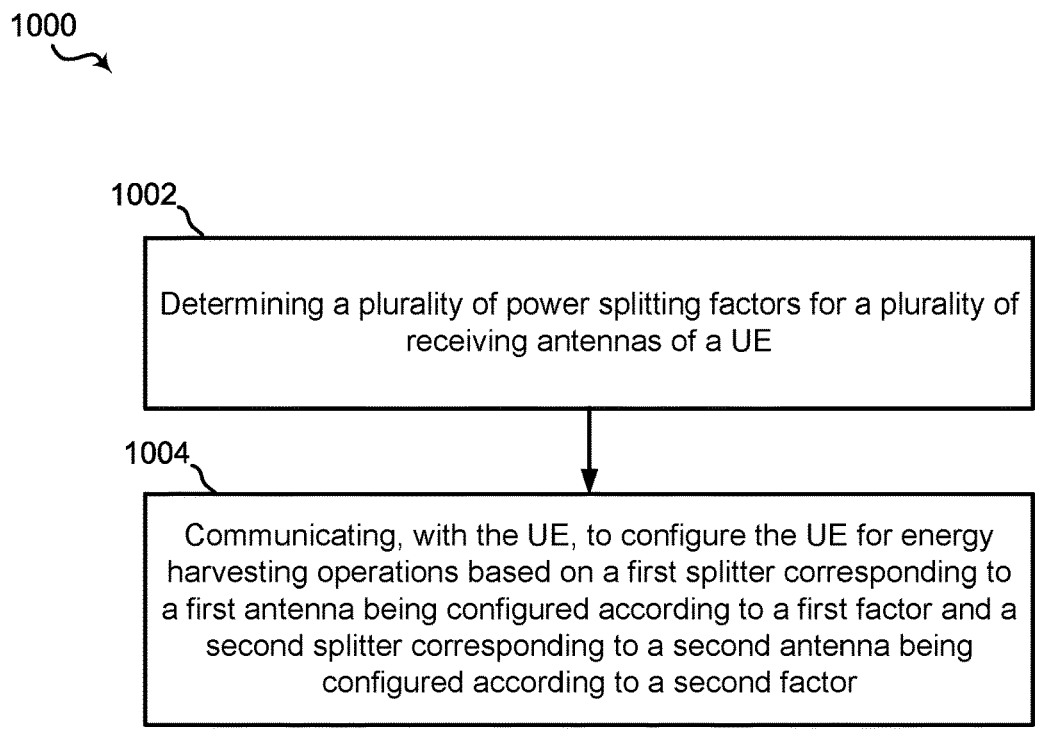
FIG. 10 is flowchart of another example method performed by the base station of FIG. 1, according to aspects of the present disclosure.

Referring to FIG. 10, an example of a method 1000 for power splitting for EH may be performed by the second EH component 146, the modem 144, the transceiver 302, the processor 312, the memory 316, and or any other component/subcomponent of the controlling device 300 of the wireless communication network 100.

At block 1002, the method 1000 may include determining a plurality of power splitting factors for a plurality of receiving antennas of a UE. For example, the second EH component 146, the modem 144, the transceiver 302, the processor 312, and/or the memory 316 of the controlling device 300, and/or one or more additional components/subcomponents of the controlling device 300 may be configured to or may comprise means for determining a plurality of power splitting factors for a plurality of receiving antennas of a UE.

For example, the determining the plurality of power splitting factors by the controlling device 300 at block 1002 may include determining by the first EH component 142, the modem 140, the transceiver 202, the processor 212, and/or the memory 216 of the controlling device 300, may include a plurality of power splitting factors (e.g., $\rho$, $\rho_L$, $\rho_M$) for a plurality of receiving antennas 544 of a UE 110.

At block 1004, the method 1000 may include communicating, with the UE, to configure the UE for energy harvesting operations based on a first splitter of a plurality of power splitters corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors. For example, the second EH component 146, the modem 144, the transceiver 302, the processor 312, and/or the memory 316 of the controlling device 300, and/or one or more additional components/subcomponents of the controlling device 300 may be configured to or may comprise means for communicating, with the UE, to configure the UE for energy harvesting operations based on a first splitter of a plurality of power splitters corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

For example, the communicating, with the UE, to configure the UE for energy harvesting operations by the controlling device 300 at block 1004 may include communicating by the first EH component 142, the modem 140, the transceiver 202, the processor 212, and/or the memory 216 of the controlling device 300, with the UE 110, to configure the UE 110 for energy harvesting operations based on the splitter 820 (e.g., first splitter) corresponding to antenna 544 (e.g., first antenna) being configured according to a power splitting factor $\rho$ (e.g., first factor) and the splitter 822 (e.g., second splitter) corresponding to antenna 544 (e.g., second antenna) being configured according to power splitting factor $\rho_L$ (e.g., second factor).

Additional Implementations

An example method of wireless communication for a UE, comprising: configuring a first splitter of a plurality of power splitters of the UE corresponding to a first antenna of a plurality of receiving antennas of the UE according to a first factor of the plurality of power splitting factors and a second splitter of the plurality of power splitters corresponding to a second antenna of the plurality of receiving antennas according to a second factor of the plurality of power splitting factors; and performing energy harvesting operations on a first signal received by the first antenna according to the first factor and on a second signal received by the second antenna according to the second factor.

The above example method, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

One or more of the above example methods, further comprising: receiving, from a controlling device, a function indication of one or more of the general function, the first specific function, or the second specific function, wherein configuring the first splitter and the second splitter is in response to receiving the function indication.

One or more of the above example methods, wherein the function indication is indicated by one or more of a MAC-CE signal or DCI signal.

One or more of the above example methods, further comprising: communicating, with a controlling device, to agree on using the plurality of power splitting factors, wherein configuring the first splitter and the second splitter is in response to communicating to agree on using the plurality of power splitting factors.

One or more of the above example methods, wherein the first specific function and the second specific function are different.

One or more of the above example methods, further comprising: transmitting, to a controlling device, a capabilities indication to indicate a capability of the UE to operate with different power splitting factors, wherein configuring the first splitter and second splitter is in response to transmitting the capabilities indication.

One or more of the above example methods, further comprising: transmitting, to a controlling device, a report listing the plurality of power splitting factors.

One or more of the above example methods, further comprising: determining, based on the plurality of power splitting factors, a level of a power splitting factor to be used for each of the plurality of receiving antennas, wherein the first factor and the second factor correspond to the level of the power splitting factor.

One or more of the above example methods, wherein the first antenna includes two or more antennas of the plurality of receiving antennas.

One or more of the above example methods, further comprising: determining the plurality of power splitting factors for the plurality of power splitters corresponding to the plurality of receiving antennas.

A second example method of wireless communication for a controlling device, comprising: determining a plurality of power splitting factors for a plurality of receiving antennas of a UE; and communicating, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

The above second example method, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

One or more of the above second example methods, further comprising: transmitting, to the UE, a function indication of one or more of the general function, the first specific function, or the second specific function, wherein communicating with the UE is in response to transmitting the function indication.

One or more of the above second example methods, wherein the function indication is indicated by one or more of a MAC-CE signal or DCI signal.

One or more of the above second example methods, further comprising: communicating, with the UE, to agree on using the plurality of power splitting factors, wherein communicating with the UE is in response to communicating to agree on using the plurality of power splitting factors.

One or more of the above second example methods, wherein the first specific function and the second specific function are different.

One or more of the above second example methods, further comprising:

receiving, from the UE, a capabilities indication to indicate a capability of the UE to operate with different power splitting factors, wherein determining the plurality of power splitting factors is in response to receiving the capabilities indication.

One or more of the above second example methods, further comprising: receiving, from the UE, a report listing the plurality of power splitting factors, wherein determining the plurality of power splitting factors is in response to receiving the report.

One or more of the above second example methods, further comprising: determining, based on the plurality of power splitting factors, a level of a power splitting factor to be used for each of the plurality of receiving antennas, wherein the first factor and the second factor correspond to the level of the power splitting factor.

One or more of the above second example methods, wherein the first antenna includes a two or more antennas of the plurality of receiving antennas.

An example UE, comprising: a memory comprising instructions; and one or more processors coupled with the memory and configured to: configure a first splitter of a plurality of power splitters of the UE corresponding to a first antenna of a plurality of receiving antennas of the UE according to a first factor of a plurality of power splitting factors and a second splitter of the plurality of power splitters corresponding to a second antenna of the plurality of receiving antennas according to a second factor of the plurality of power splitting factors; and perform energy harvesting operations on a first signal received by the first antenna according to the first factor and on a second signal received by the second antenna according to the second factor.

The above example UE, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

One or more of the above example UEs, wherein the one or more processors is further configured to: receive, from a controlling device, a function indication of one or more of the general function, the first specific function, or the second specific function, wherein configuring the first splitter and the second splitter is in response to receiving the function indication.

One or more of the above example UEs, wherein the function indication is indicated by one or more of a MAC-CE signal or DCI signal.

One or more of the above example UEs, wherein the one or more processors is further configured to: communicate, with a controlling device, to agree on using the plurality of power splitting factors, wherein configuring the first splitter and the second splitter is in response to communicating to agree on using the plurality of power splitting factors.

One or more of the above example UEs, wherein the first specific function and the second specific function are different.

One or more of the above example UEs, wherein the one or more processors is further configured to: transmit, to a controlling device, a capabilities indication to indicate a capability of the UE to operate with different power splitting factors, wherein configuring the first splitter and second splitter is in response to transmitting the capabilities indication.

One or more of the above example UEs, wherein the one or more processors is further configured to: transmit, to a controlling device, a report listing the plurality of power splitting factors.

One or more of the above example UEs, wherein the one or more processors is further configured to: determine, based on the plurality of power splitting factors, a level of a power splitting factor to be used for each of the plurality of receiving antennas, wherein the first factor and the second factor correspond to the level of the power splitting factor.

One or more of the above example UEs, wherein the first antenna includes two or more antennas of the plurality of receiving antennas.

One or more of the above example UEs, wherein the one or more processors is further configured to: determine the plurality of power splitting factors for the plurality of power splitters corresponding to the plurality of receiving antennas.

An example controlling device, comprising: a memory comprising instructions; and one or more processors coupled with the memory and configured to: determine a plurality of power splitting factors for a plurality of receiving antennas of a UE; and communicate, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

The above example controlling device, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

One or more of the above example controlling devices, wherein the one or more processors is further configured to: transmit, to the UE, a function indication of one or more of the general function, the first specific function, or the second specific function, wherein communicating with the UE is in response to transmitting the function indication.

One or more of the above example controlling devices, wherein the function indication is indicated by one or more of a MAC-CE signal or a DCI signal.

One or more of the above example controlling devices, wherein the one or more processors is further configured to: communicate, with the UE, to agree on using the plurality of power splitting factors, wherein communicating with the UE is in response to communicating to agree on using the plurality of power splitting factors.

One or more of the above example controlling devices, wherein the first specific function and the second specific function are different.

One or more of the above example controlling devices, wherein the one or more processors is further configured to: receive, from the UE, a capabilities indication to indicate a capability of the UE to operate with different power splitting factors, wherein determining the plurality of power splitting factors is in response to receiving the capabilities indication.

One or more of the above example controlling devices, wherein the one or more processors is further configured to: receiving, from the UE, a report listing the plurality of power splitting factors, wherein determining the plurality of power splitting factors is in response to receiving the report.

One or more of the above example controlling devices, wherein the one or more processors is further configured to: determining, based on the plurality of power splitting factors, a level of a power splitting factor to be used for each of the plurality of receiving antennas, wherein the first factor and the second factor correspond to the level of the power splitting factor.

One or more of the above example controlling devices, wherein the first antenna includes a two or more antennas of the plurality of receiving antennas.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication for a user equipment (UE), comprising:
configuring a first splitter of a plurality of power splitters of the UE corresponding to a first antenna of a plurality of receiving antennas of the UE according to a first factor of a plurality of power splitting factors and a second splitter of the plurality of power splitters corresponding to a second antenna of the plurality of receiving antennas according to a second factor of the plurality of power splitting factors; and
performing energy harvesting operations on a first signal received by the first antenna according to the first factor and on a second signal received by the second antenna according to the second factor.

2. The method of claim 1, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

3. The method of claim 2, further comprising:
receiving, from a controlling device, a function indication of one or more of the general function, the first specific function, or the second specific function, wherein configuring the first splitter and the second splitter is in response to receiving the function indication.

4. The method of claim 2, further comprising:
communicating, with a controlling device, to agree on using the plurality of power splitting factors, wherein configuring the first splitter and the second splitter is in response to communicating to agree on using the plurality of power splitting factors.

5. The method of claim 2, wherein the first specific function and the second specific function are different.

6. The method of claim 1, further comprising:
transmitting, to a controlling device, a capabilities indication to indicate a capability of the UE to operate with different power splitting factors, wherein configuring the first splitter and second splitter is in response to transmitting the capabilities indication.

7. The method of claim 1, further comprising:
transmitting, to a controlling device, a report listing the plurality of power splitting factors.

8. The method of claim 1, further comprising:
determining, based on the plurality of power splitting factors, a level of a power splitting factor to be used for each of the plurality of receiving antennas, wherein the first factor and the second factor correspond to the level of the power splitting factor.

9. The method of claim 1, wherein the first antenna includes two or more antennas of the plurality of receiving antennas.

10. The method of claim 1, further comprising:
determining the plurality of power splitting factors for the plurality of power splitters corresponding to the plurality of receiving antennas.

11. A method of wireless communication for a controlling device, comprising:
determining a plurality of power splitting factors for a plurality of receiving antennas of a user equipment (UE); and
communicating, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

12. The method of claim 11, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

13. The method of claim 12, further comprising:
  transmitting, to the UE, a function indication of one or more of the general function, the first specific function, or the second specific function, wherein communicating with the UE is in response to transmitting the function indication.

14. The method of claim 13, wherein the function indication is indicated by one or more of a medium access control-control element (MAC-CE) signal or downlink control information (DCI) signal.

15. The method of claim 12, further comprising:
  communicating, with the UE, to agree on using the plurality of power splitting factors, wherein communicating with the UE is in response to communicating to agree on using the plurality of power splitting factors.

16. The method of claim 12, wherein the first specific function and the second specific function are different.

17. The method of claim 11, further comprising:
  receiving, from the UE, a capabilities indication to indicate a capability of the UE to operate with different power splitting factors, wherein determining the plurality of power splitting factors is in response to receiving the capabilities indication.

18. The method of claim 11, further comprising:
  receiving, from the UE, a report listing the plurality of power splitting factors, wherein determining the plurality of power splitting factors is in response to receiving the report.

19. The method of claim 11, further comprising:
  determining, based on the plurality of power splitting factors, a level of a power splitting factor to be used for each of the plurality of receiving antennas, wherein the first factor and the second factor correspond to the level of the power splitting factor.

20. The method of claim 11, wherein the first antenna includes a two or more antennas of the plurality of receiving antennas.

21. A user equipment (UE), comprising:
  a memory comprising instructions; and
  one or more processors coupled with the memory and configured to:
    configure a first splitter of a plurality of power splitters of the UE corresponding to a first antenna of a plurality of receiving antennas of the UE according to a first factor of a plurality of power splitting factors and a second splitter of the plurality of power splitters corresponding to a second antenna of the plurality of receiving antennas according to a second factor of the plurality of power splitting factors; and
    perform energy harvesting operations on a first signal received by the first antenna according to the first factor and on a second signal received by the second antenna according to the second factor.

22. The UE of claim 21, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

23. The UE of claim 22, wherein the one or more processors is further configured to:
  receive, from a controlling device, a function indication of one or more of the general function, the first specific function, or the second specific function, wherein configuring the first splitter and the second splitter is in response to receiving the function indication.

24. The UE of claim 22, wherein the one or more processors is further configured to:
  communicate, with a controlling device, to agree on using the plurality of power splitting factors, wherein configuring the first splitter and the second splitter is in response to communicating to agree on using the plurality of power splitting factors.

25. The UE of claim 21, wherein the one or more processors is further configured to:
  determine the plurality of power splitting factors for the plurality of power splitters corresponding to the plurality of receiving antennas.

26. A controlling device, comprising:
  a memory comprising instructions; and
  one or more processors coupled with the memory and configured to:
    determine a plurality of power splitting factors for a plurality of receiving antennas of a user equipment (UE); and
    communicate, with the UE, to configure the UE for energy harvesting operations based on a first splitter of a plurality of power splitters of the UE corresponding to a first antenna of the plurality of receiving antennas being configured according to a first factor of the plurality of power splitting factors and a second splitter of the plurality of power splitters corresponding to a second antenna of the plurality of receiving antennas being configured according to a second factor of the plurality of power splitting factors.

27. The controlling device of claim 26, wherein the first factor is based on a general function corresponding to long term channel characteristics common for each of the plurality of receiving antennas and a first specific function corresponding to channel characteristics of the first antenna, and the second factor is a function of the general function and a second specific function corresponding to channel characteristics specific to the second antenna.

28. The controlling device of claim 27, wherein the one or more processors is further configured to:
  transmit, to the UE, a function indication of one or more of the general function, the first specific function, or the second specific function, wherein communicating with the UE is in response to transmitting the function indication.

29. The controlling device of claim 28, wherein the function indication is indicated by one or more of a medium access control-control element (MAC-CE) signal or downlink control information (DCI) signal.

30. The controlling device of claim 26, wherein the one or more processors is further configured to:
  communicate, with the UE, to agree on using the plurality of power splitting factors, wherein communicating with the UE is in response to communicating to agree on using the plurality of power splitting factors.

* * * * *